Nov. 15, 1927.

O. N. TEVANDER

CONVEYER

Original Filed Sept. 3, 1925    3 Sheets-Sheet 2

1,649,267

Inventor:
Olof N. Tevander

Nov. 15, 1927.
O. N. TEVANDER
1,649,267
CONVEYER
Original Filed Sept. 3, 1925  3 Sheets-Sheet 3
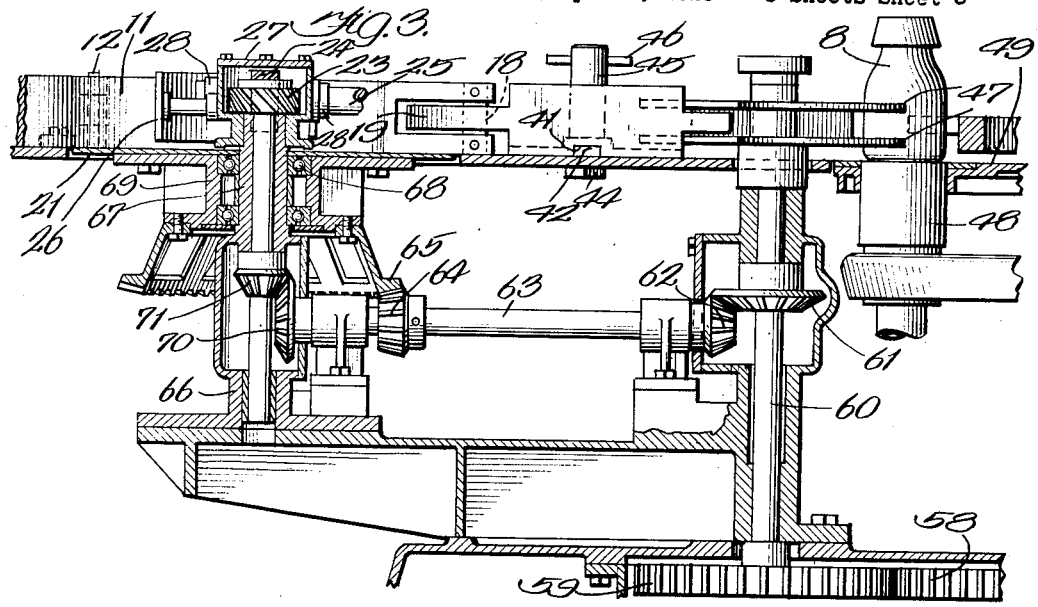
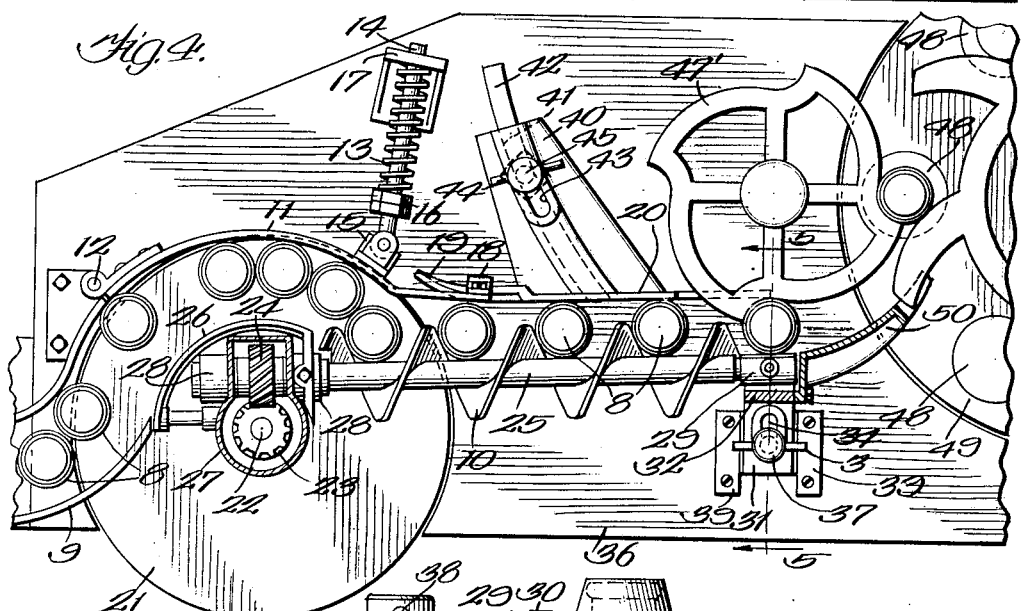
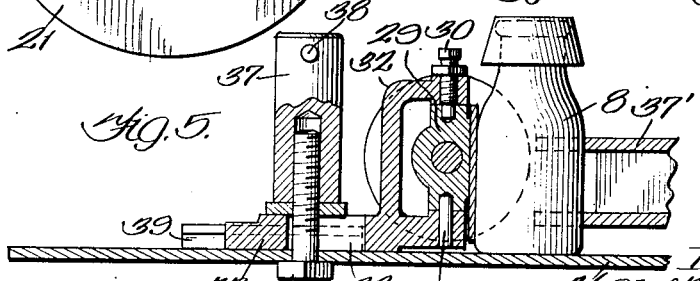
Inventor:
Olof N. Tevander Patented Nov. 15, 1927.

1,649,267

UNITED STATES PATENT OFFICE.

OLOF N. TEVANDER, OF CHICAGO, ILLINOIS, ASSIGNOR TO STANDARD CAP & SEAL CORPORATION, OF CHICAGO, ILLINOIS, A CORPORATION OF VIRGINIA.

CONVEYER.

Original application filed September 3, 1925, Serial No. 54,283. Divided and this application filed January 27, 1926. Serial No. 84,060.

My invention relates to conveying mechanism, being of particular service when embodied in apparatus for conveying milk bottles to closure applying devices, though the use of the invention is not to be thus restricted.

The invention has for one of its objects the provision of conveying mechanism enabling the delivery of objects in evenly spaced apart relation. In carrying out this object of the invention, I provide a conduit having a feeding or forwarding screw arranged along and forming one side of a portion of the conduit. The conduit wall portion opposite the screw is desirably yieldingly pressed toward the screw to vary the width of the conduit passage at the screw, in case the objects being transferred should become crowded between the crown of the screw thread and said opposite conduit wall portion. This arrangement permits and causes the crowded objects to resume or assume their proper place within the spiral space of the screw. Both or either the screw and the conduit wall portion opposite it are laterally adjustable to vary the width of the conduit space to suit it to the size of the objects being conveyed.

The invention has for another object the provision of means for feeding or forwarding the objects to be conveyed to the screw or other forwarding device employed, yet which will not forward these objects faster than the screw will properly receive them. In carrying out this object of my invention, a moving conveyer element is employed that directs the objects to the screw and upon which the objects may slip. The mechanism for driving this conveyer element and the screw is so arranged that the rate of travel of the bottles or other objects while engaged by said moving conveying element is slightly greater than the rate of travel of the objects when moved by the screw so that the screw may be filled by the bottles to capacity, yet may not be crowded due to the slippage of the bottles upon said moving conveyer element. In the preferred embodiment of the invention, this moving conveyer element is in the form of a rotating table which constitutes the bottom wall of a conduit portion that also has curved side walls concentric with the table, this conduit portion being in register with the receiving end of the other conduit portion of which the screw forms a part.

Figure 1:
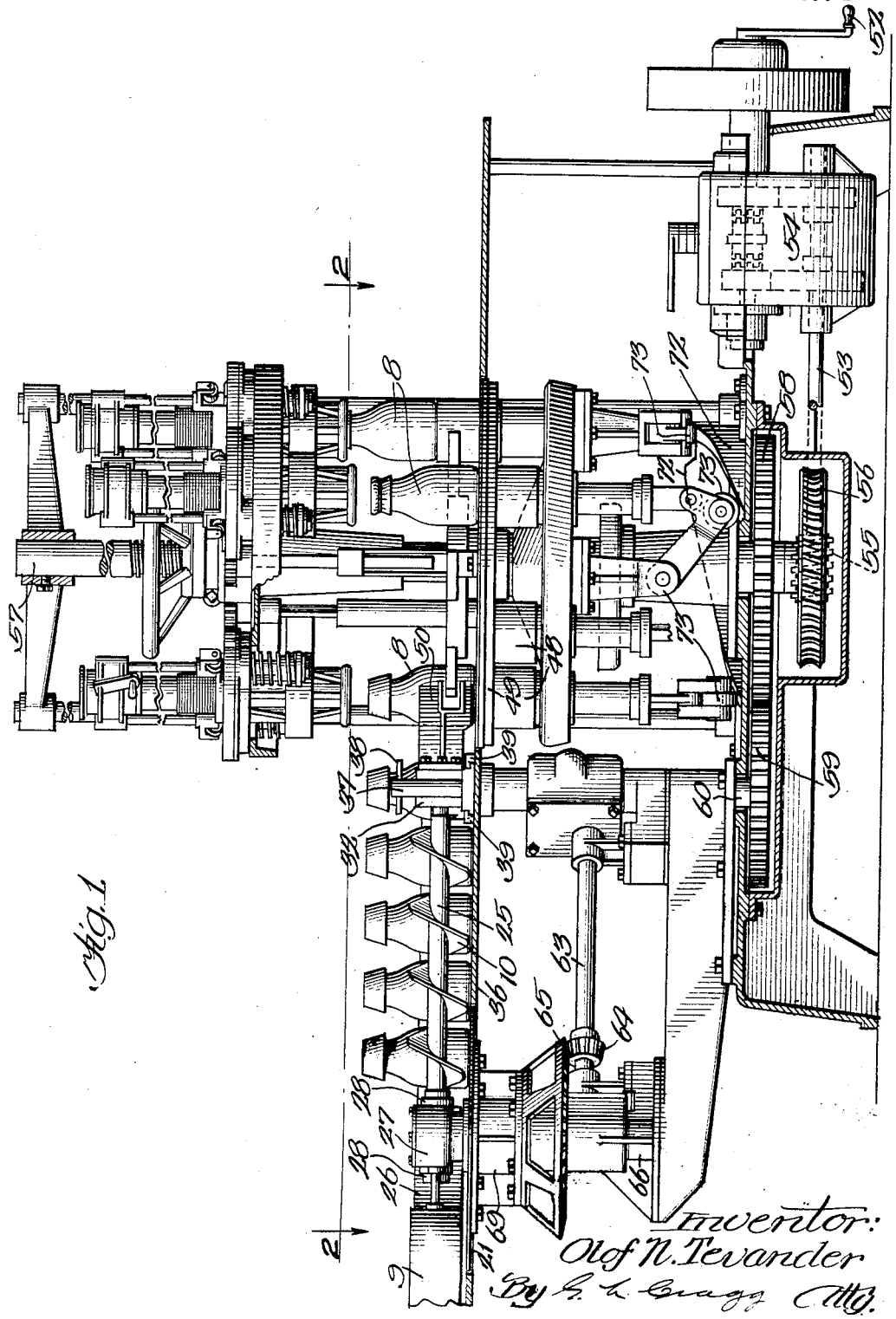
Figure 2:
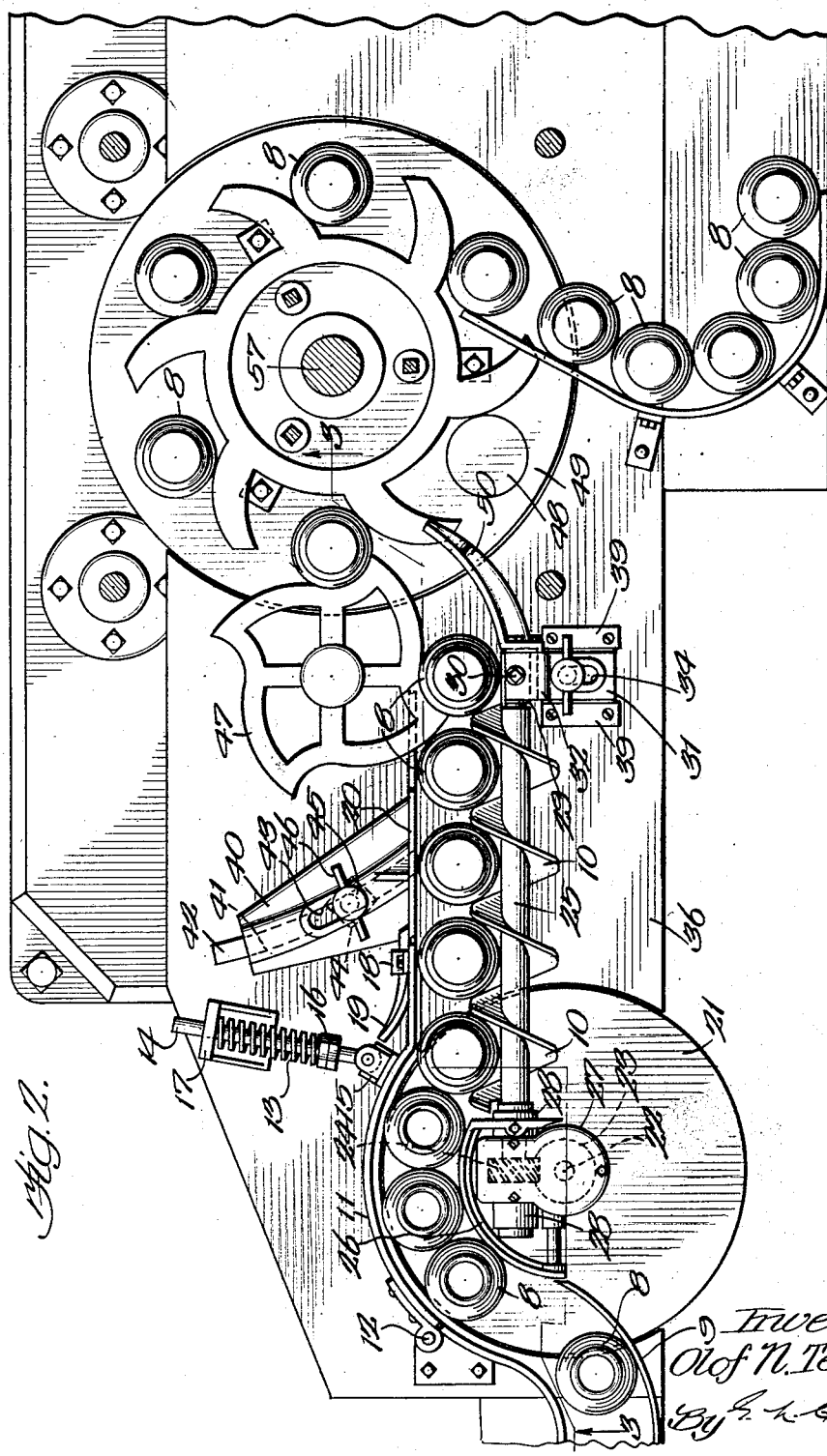

I will explain my invention more fully by reference to the accompanying drawings in which Fig. 1 is a view in elevation, with parts in section, showing a bottle capping machine having the preferred form of bottle conveyer of my invention; Fig. 2 is a sectional view on line 2—2 of Fig. 1; Fig. 3 is a sectional view on line 3—3 of Fig. 2; Fig. 4 is a view of part of the mechanism as shown in Fig. 2, with parts in changed positions; and Fig. 5 is a sectional view on line 5—5 of Fig. 4.

The bottles 8 are fed in any suitable way to a conduit 9. The discharge portion of the conduit 9 has one side composed of a bottle feeding screw 10 cooperating with the opposite conduit wall in defining the conduit spaces through which the bottles travel as they pass from the conduit. The conduit wall is inclusive of an automatically adjustable section 11 which will yield to any bottle that may encounter the crown of the thread of the feeding screw 10 as the bottle is entering engagement with the screw. This adjustable conduit side 11 is desirably hinged at 12 at one end, and is held in its normal position by means of a buffing spring 13. This spring surrounds a rod 14 that is pivotally connected with a tongue 15 projecting from the wall section 11. The spring bears, at one end, against a nut 16 screwed upon the rod 14 and, at its other end, bears against a stationary abutment 17 through which the rod slides. The front end of the wall section 11 is prevented from being projected into the conduit, by the action of the spring, by means of the stirrup 18, carried by the wall section 11, which embraces the tongue 19 upon the wall section 20 that is in front of the wall section 11. The front end of the wall section 11 is bifurcated to receive said tongue. The base of the stirrup normally engages the tongue and faces outwardly so as not to limit the outward swinging of the wall section 11. The bottles are carried to the feeding screw 10 by means of a rotating disc-like table 21, the portion of the bottle conveying conduit adjacent to the receiving end of the feeding screw overlying the table and conforming in curvature thereto.

The forwarding member or table 21 is turned upon the axis of the shaft 22. The shaft carries a worm gear 23 which is in mesh with the worm gear 24 that is fixed upon the shaft 25 of the feeding or forwarding member or screw 10. A housing is provided for the gear elements 23 and 24, this housing being fixed with respect to a section 26 of a conduit wall. The table 21 constitutes the bottom wall of a conduit portion of which the parts 11 and 26 are side walls. A complemental portion 27 of the housing is suitably assembled with the portion 26 and carries bearings 28 for the shaft 25 of the feeding screw 10. The feeding screw is capable of bodily swing movement about the axis of the shaft 22. This screw 10 is provided with means at its discharge end, whereby it may be swung in order to adjust the conduit space defined by the screw and the opposite conduit wall portions 11 and 20.

As illustrated, the shaft 25 of the screw 10 is journaled in a bearing block 29 which has trunnion connection at 30 and 31 with the sides of a yoke 32, the trunnions being arranged to enable the block 29 to turn upon an upright axis. The base of the yoke 32 is laterally extended as indicated at 33, the base extension of the yoke having a slot 34 therein. A threaded bolt 35 is passed upwardly through the stationary deck 36 into threaded connection with a sleeve 37. This sleeve has a rod 38 passed through its upper end whereby it may be turned with respect to the bolt. When the sleeve is tightened, it clamps the extended base of the yoke 32 against the deck. When it is loosened, it permits the yoke to be moved transversely of the feeding screw in the guide ways 39 to the extent permitted by the slot 34. The bearing block 29 will turn upon its upright axis to permit various adjustments thereof without binding the shaft of the screw 10. The conduit walls 11 and 20 are preferably, together, also adjustable toward and from the feeding screw. To this end, the conduit wall section 20 has a wing extension 40 formed to provide an arcuate conduit 41 that receives an arcuate rib 42 provided upon the deck 36. The top wall of the conduit portion 40 is formed with a slot 43 through which a bolt 44 passes, this bolt passing through the deck 36 and having its head engaged with the deck as does the head of the bolt 35. The bolt 44 is received in the sleeve 45 into which this bolt is screwed. The bottom end of this sleeve bears upon the top wall of the conduit portion 41. The sleeve has a rod 46 passing therethrough in order that it may be readily turned. When the sleeve 45 is loosened, the conduit wall sections 11 and 20 may together be turned about the hinge axis at 12. When these wall sections have been adjusted to selected position, the sleeve is tightened to hold them in such position. The teeth of the star wheel 47, employed for the larger bottles or the teeth of the star wheel 47', employed for the smaller bottles, serve to continue the travel of the bottles as they leave the feeding screw and to direct the same individually onto the vertically adjustable sections 48 of a disc-like table 49. The yoke 32 carries an arcuate arm 50, substantially concentric with the star wheel 47 or 47' and cooperating with the periphery of such wheel to define the final portion of the conduit through which the bottles are passed onto the table sections 48. Because of the adjustability of the feeding screw 10 and conduit wall sections 11 and 20, the bottles are brought into proper relation with the pitch circle of the employed star wheel 47 or 47'. The rate of travel of the bottle holding portions of table 21 is slightly greater than the rate of travel of the bottles being conveyed by the screw so that the screw may be filled by the bottles to capacity, yet may not be crowded due to the slippage of the bottles upon the table 21.

Any suitable mechanism may be employed for operating the various operating elements that are located above the deck 36. In the embodiment of the invention illustrated, a hand crank 52 is employed for operating a main drive shaft 53. Power is transmitted to this drive shaft at adjustable speed through the intermediation of any suitable speed changing gearing 54. The shaft 53 has a worm 55 thereon which is in mesh with a worm wheel 56. This worm wheel is fixed upon a shaft 57 on which there are also fixed the spur gear 58 and the table 49. This spur gear is in mesh with another spur gear 59 that is fixed upon a shaft 60 upon which shaft is also fixed the star wheel 47. A bevel gear 61 is also fixed upon the shaft 60 and is in mesh with a bevel pinion 62 fixed upon a shaft 63. Another bevel pinion 64 is fixed upon the shaft 63 and is in mesh with a crown gear 65 that is in fixed relation with the table 21. The axis of rotation of the crown gear 65 is defined by the bearings 66 and 67 for the shaft 22, there being roller bearings 68 interposed between the hub 69 of the crown gear 65 and the bearing 67. A bevel gear 70 is fixed upon the shaft 63 and is in mesh with a bevel pinion 71 upon the shaft 22 whereby this shaft and the parts thereon are turned. The housing portion 27 is also journaled upon the bearing 67 so as to be oscillatable as the feeding screw 10 is swung.

While the table 49 is being turned, the sections 48 thereof are gradually elevated from the plane, proper, of the table and gradually restored to this plane, the final capping operation occurring when said table sections are in their upper limits of their movements.

I provide a stationary cam track 72 upon which cam rollers 73 travel, to rise and fall. Each table section 48 is assembled with a cam roller so as to rise and fall therewith. As the shaft 57 turns, the cam rollers move bodily therewith over the cam track 72 to elevate and lower the table sections 48 to enable these table sections to rise and fall for the capping operation.

Features not herein claimed form the subject matter of my original application, Serial No. 54,283, filed September 3, 1925, of which the present application is a division.

Changes may be made without departing from the invention.

Having thus described my invention, I claim:

1. A conduit inclusive of a feeding screw arranged along and forming one side thereof, the screw being adjustable with respect to the opposite conduit wall to vary the passage in the conduit.

2. A conduit inclusive of a feeding screw arranged along and forming one side thereof, the screw and the conduit wall opposite the screw being each adjustable to vary the passage in the conduit.

3. A conduit inclusive of a movably mounted feeding screw arranged along and forming one side thereof; and means for adjusting the position of the screw toward and from the opposite wall of the conduit.

4. A conduit inclusive of a feeding screw mounted to swing and arranged along and forming one side thereof; and means for swinging the screw to a new position toward and from the opposite wall of the conduit.

In witness whereof, I hereunto subscribe my name.

OLOF N. TEVANDER.